Dec. 31, 1957 H. C. LUDWIG 2,818,496
WELDING ELECTRODE
Filed Dec. 6, 1952
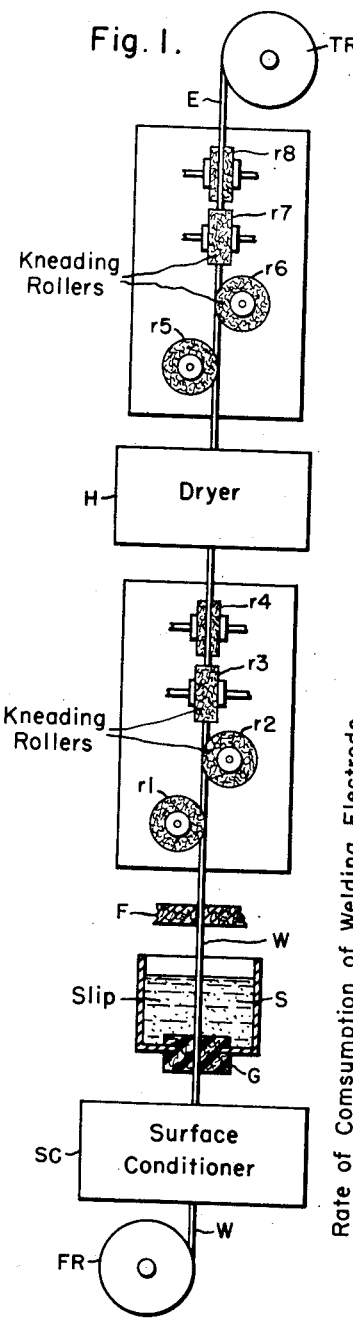
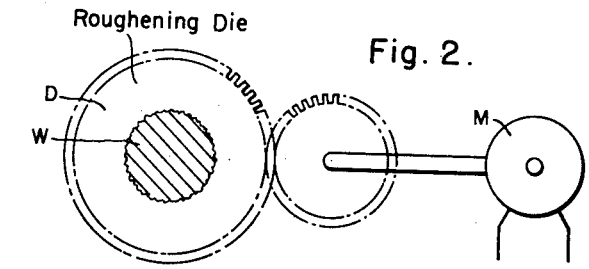
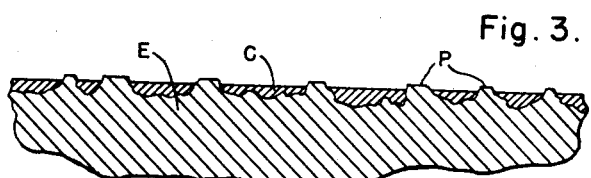
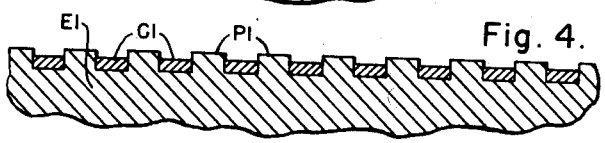
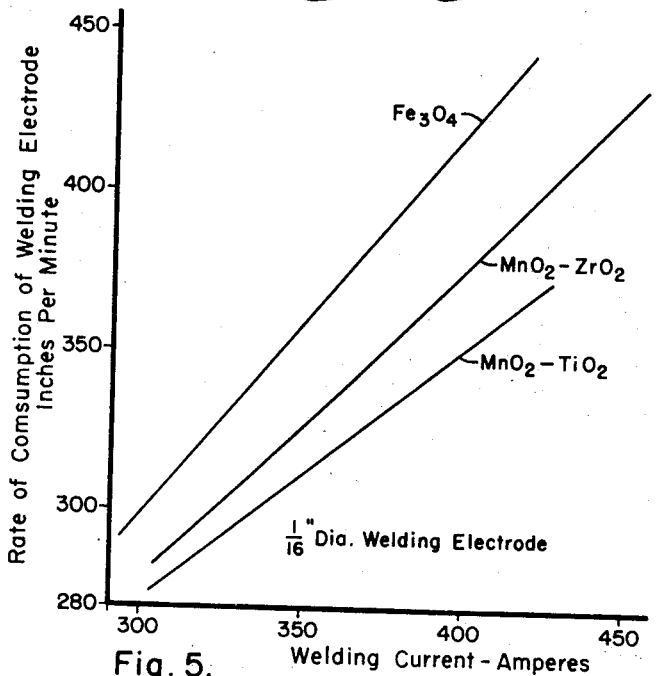
WITNESSES:
Robert C. Baird
Leon J. Laza
INVENTOR
Howard C. Ludwig.
BY
Hyman Diamond
ATTORNEY

United States Patent Office 2,818,496
Patented Dec. 31, 1957

2,818,496

WELDING ELECTRODE

Howard C. Ludwig, Pittsburgh, Pa., assignor to Westinghouse Electric Corporation, East Pittsburgh, Pa., a corporation of Pennsylvania Application December 6, 1952, Serial No. 324,473

17 Claims. (Cl. 219—146)

My invention relates to arc welding and has particular relation to welding electrodes. This application is a continuation-in-part of my application entitled "Automatic Inert Gas Arc Welding Process," Serial Number 286,348, filed May 6, 1952, and assigned to Westinghouse Electric Corporation.

My above identified pending application deals with arc welding in an inert gas shield with a consumable electrode. The application discloses principally a method of arc welding in the practice of which a small quantity of oxygen is included with the inert gas. With the oxygen present in the inert gas, the arc is stabilized and not only is the welding at reverse polarity, that is with the electrode positive and the work negative, improved but satisfactory welding may also take place at straight polarity.

I have found that while the method of welding as disclosed in my pending application is on the whole satisfactory for many purposes, it has several disadvantages which while in general minor are important in certain situations. The quantity of oxygen required to produce stabilization is excessive. The excess of oxygen has a tendency to combine with certain elements which compose the material being welded to produce undesirable gaseous and solid compounds and to suppress this tendency substantial quantities of deoxidizing agents must be added in carrying out the welding methods in accordance with my pending application. Difficulty is also involved in providing the oxygen inert-gas mixture.

It is accordingly a broad object of my invention to provide for stabilizing a welding arc operating in an inert gas shield which does not include excessive quantities of oxygen.

Another broad object of my invention is to eliminate the instability of a welding arc operating in a shield of substantially pure inert gas.

My invention in its broader aspects arises from the realization that excessive oxygen is required to stabilize an arc in accordance with the teachings of my pending application because of the manner in which the oxygen is introduced into the arc. I have conceived that the oxygen produces the stabilization by providing an atmosphere in which the welding electrode is oxidized and that the oxidation of the welding electrode tends to maintain the arc stabilized. When the oxygen is introduced in the inert gas, it produces the oxidation of the electrode indirectly and because of this indirect action, an excess of oxygen is required to produce the stabilization. It appears desirable then to provide a welding electrode with which the oxygen is intimately associated.

It is accordingly a specific object of my invention to provide a welding electrode which shall produce a stable welding arc in a shield of inert gas substantially free of oxygen.

Another specific object of my invention is to provide a welding electrode which shall suppress instability in the arc when operating in a shield of a substantially pure inert gas either at straight or at reverse polarity or with alternating potential impressed between the electrode and the work.

A further specific object of my invention is to provide a welding electrode particularly suitable for operation at straight polarity in an inert gas atmosphere which shall improve the penetration of the filler material into the work being welded.

Still another specific object of my invention is to provide a welding electrode for welding with any selectable penetration particularly at straight polarity.

A still further object of my invention is to provide a method and apparatus for producing an arc stabilizing welding electrode.

An ancillary object of my invention is to provide a welding electrode having an effective arc-stabilizing coating which shall at the same time be capable of stabilizing electrical contact with a supply source at any point along its length.

In accordance with the specific aspects of my invention, I provide a welding electrode which has a coating of an oxide or of other oxygen containing material. Since a welding electrode is flexed and bent while in use, the coating should be very thin, so that the bending of the electrode does not break the coating. A thin coating is also desirable to avoid any excess of oxygen from the oxide.

The oxide or the oxygen containing material may be applied chemically as by oxidation processes or by processes identified by the trade names Bonderizing, Parkerizing, Granodizing, Costellizing, or it may be applied mechanically. In either event the surface of the electrode is in accordance with my invention conditioned for the deposit by roughening. The roughening should be such as to produce fine irregularities distributed substantially uniformly over the surface. This conditioning of the surface of the wire has several advantages among which the most important are that the quantity of coating material which may be deposited is substantially increased so that adequate material for stabilizing is available in a relatively thin coating. The roughening also has the advantage that it provides projections between the coated regions through which electrical contact between the electrode and the welding power supply may be made.

The quantity of material deposited on the electrode depends on the diameter of the electrode and the rate at which the filler material from the electrode is to be deposited in use. The thickness of the layer of the coating should be just sufficient to produce arc stabilization with the electrode arc terminus remaining substantially fixed just at or very near the end of the electrode. I have found that this object may be accomplished for electrodes of a diameter commonly encountered in practice even when the metal from it is to be deposited at a very high rate with a very thin layer of the order of a few milligrams per foot of oxygen material on the electrode. I have further found that if the layer is so thin that the stabilizing material is inadequate to maintain the arc stable for the given diameter of welding electrode and rate of deposit of material, the arc tends to rise along the wall of the electrode seeking stabilizing material. If a substantial excess of the stabilizing material is present undesired oxides are produced in the weld and the weld may be of inferior quality.

By actually conducting welding operations I have found that numerous oxides and oxygen containing materials may be used. Among these are ferroso-ferric oxide ($Fe_3O_4$), manganese dioxides ($MnO_2$), titanium dioxide ($TiO_2$), calcium oxide (CaO), cerium dioxide and combinations of these oxides. In addition, I have found that coatings of tertiary phosphates, applied particularly to steel electrodes by bonderizing for example, and of lithium carbonate ($Li_2CO_3$) are suitable.

Suitable coating materials have several properties in common. It is essential that the coating material should be non-hygroscopic. The release of water vapor during the welding operation deteriorates the weld. The coating should also be as homogeneous as practicable. In addition, higher valent oxygen compounds appear preferable for coating.

It is my theory based on the latter observation that the compounds which when coated on a welding electrode most effectively produce stabilization are higher valent oxygen compounds which in the heat of an arc are dissociable into lower valent compounds giving up oxygen. While this theory seems highly credible, it is to be understood that I do not intend to be bound by it and this application should not be so interpreted.

The novel features that I consider characteristic of my invention have been discussed generally above. The invention itself, however, both as to its organization and its method of operation together with additional objects and advantages thereof will best be understood from the following description of specific embodiments when read in connection with the accompanying drawing in which:

Figure 1 is a diagrammatic view of apparatus for providing a coating in accordance with my invention on a welding electrode;

Fig. 2 is a diagrammatic view of one surface conditioner which may be used in the practice of my invention;

Fig. 3 is a view in cross section enlarged of an electrode in accordance with my invention;

Fig. 4 is a view in cross section enlarged of another electrode in accordance with my invention; and Fig. 5 is a graph showing a property of welding electrodes in accordance with my invention.

The apparatus shown in Fig. 1 is used to coat the welding electrode mechanically and includes a feed reel FR from which a wire W to be coated is derived and a take-up reel TR on which the coated electrode, in accordance with my invention, is wound.

For driving the wire W power may be applied to the take-up reel TR by a motor (not shown). The use of a feed reel FR in the apparatus shown in Fig. 1 presupposes that the wire W has been drawn before it is treated. In certain situations it may be highly practical to coat the wire just after it is drawn. In such situations the feed reel FR is replaced by the drawing apparatus and the wire W is fed directly from the drawing apparatus into the coating apparatus.

From the feed reel FR the wire W is supplied to a surface conditioner SC which produces on the surface of the wire W a roughening consisting of fine irregularities uniformly distributed over the surface of the wire. The irregularities should have a depth at least of the order of 33 to 62 microinches R. M. S. The roughening may be produced by ordinary sandblasting and wire so sandblasted has been found entirely suitable. The roughening may also be produced by drawing the wire W through a roughening die D as shown in Fig. 2. This die may be a hollow cylinder or disc, the internal surface of which has fine teeth or knurls. The internal diameter of the die is so related to the diameter of the wire W that as the wire is pulled through the die irregularities are cut in the surface of the wire. The die may be geared to a motor M and rotated to improve the uniformity of the irregularity.

The roughening may also be etched into the wire by drawing the wire through a suitable acid or caustic solution. I have found that the desired roughening may be produced by drawing the wire slowly through sulfuric or hydrochloric acid having a concentration of 25% by volume and maintained at 150° Fahrenheit. To produce irregularities of the desired depth the wire should be maintained in the acid bath for a time interval of the order of several minutes.

The wire W with its surface conditioned as described above is passed through a packing gland G into a slip S of the compound to be coated on the wire. The slip S is produced by mixing a powder of the material in water, alcohol, or other readily evaporating medium. The slip must be very thoroughly mixed so that it is homogenous to the extent practicable; particularly is homogeneity necessary where several different compounds are applied to the wire W. The wire with the slip sticking to it is then passed through a felt pad F and is engaged by a plurality of felt rollers $r1$, $r2$, $r3$ and $r4$ which knead the coating into the spaces between the irregularities in the wire. Thereafter the wire W is passed through a drier H where it is heated so that the liquid remaining in the surface coating is thoroughly evaporated. The wire W passes through another plurality of felt rollers $r5$, $r6$, $r7$, or $r8$ which further knead the coating into the surface of the wire and in addition have a polishing effect removing coating from the projecting surfaces of the wire. The rollers $r5$, $r6$, $r7$, $r8$ may be glass cloth rather than felt.

An electrode E is thus produced; this electrode has a thin layer or coating (of the order of a few milligrams per foot for $1/16''$ wire) of the desired material on its surface and is so wound onto the take-up reel. Because the coating is thin the electrode may be readily wound on the take-up reel TR without disrupting the coating.

An enlarged section of one modification of the treated electrode E is shown in Fig. 3. From this view it is seen that the coating C is deposited in the region between projections P of the wire. The projections P extend between coated regions and provide surfaces at which electrical contact may be made with the electrode. The electrode produced usually has the form shown in Fig. 3 in which the surfaces P have no coating. It may also happen (particularly when the coating is chemically applied) that the coating may cover the projections P. This does not affect the ability of the wire to establish electrical contact, because the coating is very thin and when the electrode passes through the apparatus the coating on the projections P is rubbed off by the frictional contact with the apparatus.

An enlarged section of another modification of the treated electrode E1 is shown in Fig. 4. In this case the projections P1 are of uniform dimensions and are uniformly spaced and the coating C1 is deposited in the uniform spaces. A wire of this type would be produced with the roughening apparatus shown in Fig. 2.

When in use the electrode E (or E1) is transmitted through a welding head of the general type disclosed in Fig. 5 of my pending application which does not, however, include deoxidizing powder (D Fig. 5). The projecting surfaces P (or P1) of the electrode then engage the adjacent conducting surfaces of the welding head and electrical contact is thus established between the electrode and the conducting portion of the welding head which is in turn connected to one terminal of the welding power supply. The other terminal of the supply is connected to the work and thus an arc is produced and supplied between the work and the electrode E (or E1).

The apparatus shown in Fig. 1 is suitable for applying the coating to the wire mechanically. The coating may also be applied chemically and in such event the wire is passed through the necessary chemical solutions, instead of the mechanical coating apparatus, after its surface has been conditioned.

For example, a steel electrode coated with ferroso-ferric oxide which has proved highly satisfactory in the practice of my invention was produced chemically. This original wire is in this case of the type known in the trade as Mayari-R wire sold by Bethlehem Steel Company and an analysis of a wire actually used showed it to have the following composition:

| | Percent |
|---|---|
| Carbon | .08 |
| Sulphur | .025 |
| Phosphorus | .056 |
| Manganese | .53 |
| Silicon | .22 |
| Chromium | .43 |
| Nickel | .32 |
| Copper | .39 | and the remainder iron.

To produce the electrode a wire of this type having a diameter of one sixteenth of an inch was treated as follows:

(1) The wire was sandblasted with #60 Alundum grit projected under 60 pounds per square inch air pressure from nozzles displaced at 120° with reference to the wire. The wire traveled through the sandblasting chamber at between 48 and 150 inches per minute. This rate of travel is relatively low. If a higher rate of travel is desired the number of nozzles and the pressure may be increased in any manner desired.

The wire roughened by sandblasting was passed through a mixture of chemicals composed of sodium hydroxide and potassium nitrate to which urea was added as a catalyzer. The solution was maintained at boiling temperature (between 290° and 300° Fahrenheit) and the wire was immersed in the solution from a time interval of from 5 to 30 minutes. A typical treating solution included the following chemicals per gallon of water: sodium hydroxide—80 ounces, potassium nitrate—50 ounces, urea—2 ounces.

A Mayari-R wire of the type described above may also be provided with a coating of tertiary phosphate chemically. The phosphate is usually insoluble (in water) and may be applied by several methods which are termed in the art phosphatizing. Usually the solution used in phosphatizing contains orthophosphoric acid as a common constituent. In addition the solution includes zinc phosphate, zinc dihydrogen phosphate, ferrous phosphate, ferrous dihydrogen phosphate, and manganese dihydrogen phosphate. These compounds are included either alone or in various combinations. The phosphate to free acid ratio is usually between 7 to 1 to 8 to 1. In each of the phosphatizing methods hydrogen is evolved at the metal surface and the phosphate precipitates. Accelerators of the reaction in the form of mild oxidizing agents such as the nitrates or nitrites of alkali metals, copper salts and nitro derivatives of aliphatic and aromatic compounds are ordinarily used.

In a typical situation I phosphatized a steel wire of the type described above with a bonderizing solution containing phosphate, orthophosphoric acid and a copper salt. The solution was maintained at a temperature of about 90° centigrade and the wire was immersed in the solution for about 10 minutes. The coating produced in this way had a thickness of between 0.0003 inch and 0.0005 inch.

In practicing my invention I made a number of welds with various coatings on the wire. Certain of the measurements conducted in making these welds are presented in the following table:

| No. of row | Type of coating | Quantity of coating in milligrams per foot | Welding current in amperes | Rate of consumption of electrode in inches per minute | Roughening treatment | How coating was applied | Approx. arc voltage |
|---|---|---|---|---|---|---|---|
| 1 | Fe₃O₄ | 5 to 10 (calculated) | 405 | 441 | Sandblasting | Chemically | 30 |
| 2 | MnO₂ | 3 (measured) | 405 | 406 | do | Mechanically | 28½ |
| 3 | TiO₂ | 2 (measured) | 425 | 396 | do | do | 28½ |
| 4 | CaO | 4 (measured) | 440 | 324 | do | do | 28 |
| 5 | Phosphates | | 400 | | do | Chemically | 26 |
| 6 | Li₂CO₃ | | 360 | | do | Mechanically | |
| 7 | MnO₂, TiO₂, 5/1 | | 410 | 399 | do | do | 29 |
| 8 | MnO₂, TiO₂, 2/1 | 5 (measured) | 425 | 399 | do | do | 28 |
| 9 | MnO₂, TiO₂, 1/1 | 3.3 (measured) | 401 | 396 | do | do | 29 |
| 10 | MnO₂, TiO₂, 1/2 | 5.3 | 405 | 396 | do | do | 29 |
| 11 | MnO₂, TiO₂, 1/5 | 3.2 | 440 | 396 | do | do | 29 |
| 12 | TiO₂, MnO₂, 5/1 | | 425 | 333 | do | do | 27 |
| 13 | Fe₃O₄ | 5 to 10 (calculated) | 385 | 414 | do | Chemically | 28½ |
| 14 | do | do | 340 | 360 | do | do | 30½ |
| 15 | Fe₃O₄ | do | 295 | 300 | do | do | 29 |
| 16 | Fe₃O₄ | do | 365 | 363 | do | do | 30 |
| 17 | Fe₃O₄ | do | 310 | 303 | do | do | 30½ |
| 18 | MnO₂, TiO₂, 5/1 | | 355 | 315 | do | do | 30 |
| 19 | MnO₂, TiO₂, 5/1 | | 305 | 278 | do | Mechanically | 28½ |
| 20 | MnO₂, TiO₂, 5/1 | | 410 | 359 | do | do | 28½ |
| 21 | MnO₂, ZrO₂, 5/1 | | 398 | 371 | Etched—H₂SO₄ | do | 29 |
| 22 | MnO₂, ZrO₂, 5/1 | | 335 | 312 | do | do | 29½ |
| 23 | MnO₂, ZrO₂, 5/1 | | 300 | 301 | do | do | 27 |
| 24 | MnO₂, ZrO₂, 5/1 | | 455 | 432 | do | do | 26 / 29 |

All of the welds from which the above table was derived were made with Mayari-R wire 1/16 inch in diameter. In all cases low carbon mild steel was welded, and the operation was at straight polarity. In all cases a shield of pure argon was provided, the argon flowing at 45 cubic feet per hour. When the coating was applied mechanically the slip was made up of material of particles having dimensions which varied from 200 mesh to dust. In the cases in which the wire was roughened by etching, the etching was applied with sulfuric acid in a 25% by volume solution maintained at 150° F. and the wire was treated with the acid for at least 7 minutes.

The welds were made with a welder of the type shown in Fig. 5 of my pending application. Specifically for many of the welds a Linde welder SWM-2 was used. In all cases sound welds were produced. The welds produced with the electrode covered with ferroso-ferric oxide were tested for ductility and proved exceptionally ductile.

All of the welds except those produced with phosphatized wire were made with a welding head which required that the arc voltage measurement be made with the measuring electrodes between the work and a point on the welding wire remote from the tip at which the arc was produced. A correction of 2½ volts for voltage drop along the wire was therefore made in these measurements and the data in the last column is in each case except for the phosphatized wire the measured data less 2½ volts. It may be that the correction of 2½ volts is too low and for this reason the voltage for the phosphatized wire is substantially lower than the other voltages.

While the arc was maintained stabilized in all cases, coatings including substantial quantities of manganese dioxide have the advantage that they produce a superior surface on the weld. In addition to producing operation with improved stability, manganese dioxide, titanium dioxide and calcium oxide, have the advantage over ferroso-ferric oxide in that the latter has a tendency to spray solid material towards the wall of the inert gas nozzle and thus to build up a blocking layer across the opening of the nozzle whereas the former do not.

Attention is called to the fourth column of the table which shows the rate of electrode consumption. This column shows that for the same approximate power consumed in the arc the consumption rate of wire coated with ferroso-ferric oxide is higher than the consumption rate for wire coated with manganese dioxide and the consumption rate for wire coated with calcium oxide is substantially lower than for wire coated with manganese dioxide. The rate of consumption in effect measures the heat developed at the welding electrode. The fourth column then indicates that for substantially the same power input to the arc less heat is developed at the electrode for a coating of calcium oxide than for manganese dioxide and less is developed for manganese dioxide than for ferroso-ferric iron oxide. Since the power in the arc is in each case the same, the deficiency of the heat developed at the electrode must be compensated by the corresponding increase in the heat developed at the work and an increased penetration of the welding material into the work. Thus different coatings produce different penetrations. One feature of my invention then is the facility for providing welding wires capable of producing desired penetrations.

This feature of my invention is shown in another way in Fig. 5 in which rate of consumption is plotted vertically and welding current horizontally for rows 13 through 17, 18 through 20 and 21 through 24 of the table. Fig. 5 shows that the graph for the ferroso-ferric oxide coating has the highest slope, the graph for the manganese dioxide, zirconium dioxide coating, an intermediate slope and the graph for the manganese dioxide, titanium dioxide coating a somewhat smaller slope. Only one measurement is available for calcium oxide and this measurement indicates that the slope of the corresponding curve of calcium oxide would be even smaller than for the manganese dioxide, titanium dioxide curve.

The slope of the curves is a measure of the rate of consumption of the electrode at a given power and thus of the energy absorbed at the work if the welding is at straight polarity. Since the energy absorbed at the work determines the penetration, desired penetration may be achieved by selecting in accordance with the curve the required electrodes.

I have also investigated electrodes coated with a mixture of manganese dioxide, titanium dioxide and calcium oxide and have found this mixture to have an even more marked effect on the heat developed at the work than calcium oxide alone. One feature of my invention is the provision of different electrodes having coatings consisting of different mixtures of manganese dioxide, titanium dioxide and calcium oxide which could be used in accordance with the penetration desired.

While as a rule stabilization is effected with the electrode according to my invention without producing an excess of oxygen. In certain situations an excess of oxygen may be produced and in such situation it is desirable that a deoxidizing agent should be included in the wire or in the coating.

While I have shown and described certain specific aspects of my invention, many modifications thereof are possible. Thus while my invention is disclosed herein specifically as embodied in ferrous electrodes, in its broader aspects, it is applicable to electrodes of other metals and alloys, such as aluminum and its alloys and copper and its alloys.

My invention thus is not to be restricted except insofar as necessitated by the spirit thereof in view of the prior art.

I claim as my invention:

1. A consumable welding electrode for welding work comprising a ferrous wire having a roughened surface and having deposited on said surface a thin layer of oxygen containing material said material consisting of at least one oxygen containing compound selected from the class consisting of metal oxides, metal phosphates and metal carbonates, the said compound or compounds being such that during the arc welding process it stabilizes the arc, the thickness of said layer being so related to the diameter of said wire and to the contemplated rate of consumption of said electrode that when said electrode is in use just sufficient oxygen to maintain the arc stabilized without producing substantial oxidation of the work is available immediately adjacent that end of said electrode which is being melted.

2. A consumable welding electrode for welding work comprising a ferrous wire having a roughened surface and having deposited on said surface a thin layer of substantially only ferroso-ferric oxide, the thickness of said layer being so related to the diameter of said wire and to the contemplated rate of consumption of said electrode that when said electrode is in use just sufficient oxygen to maintain the arc stabilized without producing substantial oxidation of the work is available immediately adjacent that end of said electrode which is being melted.

3. A consumable welding electrode for welding work comprising a ferrous wire having a roughened surface and having deposited on said surface a thin layer of substantially only a tertiary phosphate, the thickness of said layer being so related to the diameter of said wire and to the contemplated rate of consumption of said electrode that when said electrode is in use just sufficient oxygen to maintain the arc stabilized without producing substantial oxidation of the work is available immediately adjacent that end of said electrode which is being melted.

4. A consumable welding electrode for welding work comprising a ferrous wire having a roughened surface and having deposited on said surface a thin layer of oxygen containing material, said material consisting substantially only of at least one oxygen compound selected from the group consisting of ferroso-ferric oxide, manganese dioxide, tertiary phosphates, titanium dioxide, calcium oxide and cerium dioxide, the thickness of said layer being so related to the diameter of said wire and to the contemplated rate of consumption of said electrode that when said electrode is in use just sufficient oxygen to maintain the arc stabilized without producing substantial oxidation of the work is available immediately adjacent that end of said electrode which is being melted.

5. A consumable welding electrode for welding work comprising a ferrous wire having a roughened surface and having deposited on said surface a thin layer of oxygen containing material, said material consisting substantially only of one or more non-hygroscopic, higher-valent oxygen compounds which in the heat of an arc are dissociable into lower-valent compounds giving up oxygen, the said compound or compounds being selected from the class consisting of metal oxides, metal phosphates and metal carbonates, the said compound or compounds also being such that during the arc welding process it stabilizes the arc, the thickness of said layer being so related to the diameter of said wire and to the contemplated rate of consumption of said electrode that when said electrode is in use just sufficient oxygen to maintain the arc stabilized without producing substantial oxidation of the work is available immediately adjacent that end of said electrode which is being melted.

6. A consumable welding electrode for welding work in a gas shield of substantially pure inert gas comprising a ferrous wire having deposited on its surface a thin layer of an oxygen containing material said material consisting of at least one oxygen containing compound selected from the class consisting of metal oxides, metal carbonates and metal phosphates, the said compound or compounds being such that during the arc-welding process it stabilizes the arc, the thickness of said layer being so related to the diameter of said wire and rate of consumption of said electrode that when said electrode is in use just sufficient oxygen to stabilize the arc without producing substantial oxidation of the work is available immediately adjacent the end of said electrode which is being melted and means on said surface providing for electrical contact with said surface through said layer at any point along the length of said electrode.

7. A consumable welding electrode for welding work comprising a ferrous wire having a roughened surface and having deposited on said surface a thin layer of substantially only manganese dioxide, the thickness of said layer being so related to the diameter of said wire and to the contemplated rate of consumption of said electrode that when said electrode is in use just sufficient oxygen to maintain the arc stabilized without producing substantial oxidation of the work is available immediately adjacent that end of said electrode which is being melted.

8. A consumable arc-welding electrode comprising a ferrous wire having a roughened surface of roughness of the order of at least 33 to 62 microinches RMS and having a thin layer of manganese dioxide on said surface, the thickness of said layer being so related to the diameter of said wire and to the contemplated rate of consumption of said electrode that when said electrode is in use just sufficient manganese dioxide to maintain the arc stabilized is available immediately adjacent that end of said electrode which is being melted.

9. A consumable welding electrode for welding work in a gas shield of substantially pure inert gas comprising a ferrous wire having deposited on its surface a thin layer of an oxygen containing material said material consisting of at least one oxygen containing compound selected from the class consisting of metal oxides, metal carbonates and metal phosphates, the said compound or compounds being such that during the arc-welding process it stabilizes the arc, the thickness of said layer being so related to the diameter of said wire and contemplated rate of consumption of said electrode that when said electrode is in use sufficient oxygen to stabilize the arc is available immediately adjacent the end of said electrode which is being melted, said wire including in its composition deoxidizing means for absorbing any excess oxygen from said layer and means on said surface providing for electrical contact with said surface through said layer at any point along the length of said electrode.

10. A consumable welding electrode for welding work in a gas shield of substantially pure inert gas comprising a ferrous wire having deposited on its surface a thin layer of an oxygen containing material, said material consisting of at least one oxygen containing compound selected from the class consisting of metal oxides, metal carbonates and metal phosphates, the said compound or compounds being such that during arc-welding process it stabilizes the arc, the thickness of said layer being so related to the diameter of said wire and to the contemplated rate of consumption of said electrode that when said electrode is in use just sufficient oxygen to stabilize the arc without producing substantial oxidation of the work is available immediately adjacent the end of said electrode which is being melted and means on said surface providing for electrical contact with said surface through said layer at any point along the length of said electrode, said layer material including at least a substantial proportion of manganese dioxide, said manganese dioxide being one of the compounds of which said layer consists.

11. A consumable welding electrode for welding work in a gas shield of pure inert gas comprising a ferrous wire having a roughened surface and having deposited on said surface a thin layer of an oxygen containing material, said material consisting of at least one oxygen containing compound selected from the class consisting of metal oxides, metal carbonates and metal phosphates, the said compound or compounds of said material and the thickness of said layer being so related to the diameter of said wire and contemplated rate of consumption of said electrode that when said electrode is in use just sufficient oxygen to stabilize the arc without producing substantial oxidation of the work is available immediately adjacent the end of said electrode which is being melted and the composition of said material being such that when the electrode is in use there is a predetermined distribution of the energy in the arc between the electrode and the work in said inert gas.

12. A consumable welding electrode for welding work comprising a ferrous wire having a roughened surface and having deposited on said surface a thin layer of oxygen containing material, said material being a mixture composed substantially only of manganese dioxide, titanium dioxide, and calcium oxide in predetermined proportions, the thickness of said layer being so related to the diameter of said wire and to the contemplated rate of consumption of said electrode that when said electrode is in use just sufficient oxygen to maintain the arc stabilized without producing substantial oxidation of the work is available immediately adjacent that end of said electrode which is being melted, said proportions being selected so as to yield a predetermined penetration into said work during a welding operation.

13. A consumable welding electrode for welding work in a gas shield of substantially pure inert gas comprising a ferrous wire having essentially the composition

| | Percent |
|---|---|
| Carbon | .08 |
| Sulphur | .025 |
| Phosphorus | .056 |
| Manganese | .53 |
| Silicon | .22 |
| Chromium | .43 |
| Nickel | .32 |
| Copper | .39 | and the remainder iron, and having a diameter of the order of 1/16" having deposited on its surface a thin layer of an oxygen containing material, said material consisting of at least one oxygen containing compound selected from the class consisting of metal oxides, metal carbonates and metal phosphates, the said compound or compounds being such that during the arc-welding process it stabilizes the arc, the thickness of said layer being so related to the diameter of said wire that the layer material is present in quantities of the order of 2 to 10 milligrams per foot, said electrode to be consumed in use at the rate of the order of 300 to 450 inches per minute, whereby when said electrode is in use just sufficient oxygen to stabilize the arc without producing substantial oxidation of the work is available immediately adjacent the end of said electrode which is being melted, and means on said surface providing for electrical contact with said surface through said layer at any point along the length of said electrode.

14. A consumable welding electrode for welding work in a gas shield of substantially pure inert gas comprising a ferrous wire having deposited on its surface a thin layer of an oxygen containing material, said layer material consisting substantially only of manganese dioxide, titanium dioxide and calcium oxide in predetermined proportions, the thickness of said layer being so related to the diameter of said wire and the contemplated rate of consumption of said electrode that when said electrode is in use just sufficient oxygen to stabilize the arc without producing substantial oxidation of the work is available immediately adjacent the end of said electrode which is being melted, and means on said surface providing for electrical contact with said surface through said layer at any point along the length of said electrode, said proportions being selected to yield a predetermined penetration into the work during the welding operation.

15. A consumable welding electrode for welding work in a gas shield of pure inert gas comprising a ferrous wire having a roughened surface and having deposited on said surface a thin layer of an oxygen containing material, said layer material being composed substantially only of manganese dioxide, titanium dioxide, and calcium oxide in predetermined proportions, the thickness of said layer being so related to the diameter of said wire and contemplated rate of consumption of said electrode that when said electrode is in use just sufficient oxygen to stabilize the arc without producing substantial oxidation of the work is available immediately adjacent the end of said electrode which is being melted and the composition of said material being such that when the electrode is in use there is a predetermined distribution of the energy in the arc between the electrode and the work in said inert gas, said proportions being selected so as to yield said energy distribution.

16. A consumable welding electrode for use in arc-welding processes comprising a ferrous wire having a surface of a roughness of the order of at least 33 to 62 microinches R. M. S. and applied to said surface, a thin layer comprising at least one oxygen containing compound selected from the group consisting of metal oxides, metal phosphates and metal carbonates, uncoated surface portions projecting above said thin layer to provide for electrical contact to said wire along the length of the wire, the said oxygen containing compound being such that during the arc-welding process it stabilizes the arc, the thickness of the layer being so related to the diameter of said wire and to the contemplated rate of consumption of said electrode that during arc-welding sufficient oxygen is available at the end of the electrode as it is being melted to maintain a stabilized arc without producing substantial oxidation of the work being welded, the amount of the oxygen containing compound being equivalent to the order of 2 to 10 milligrams per foot of 1/16" diameter wire.

17. A consumable welding electrode for use in arc-welding processes comprising a ferrous wire having a surface of a roughness of the order of at least 33 to 62 microinches R. M. S. and applied to said surface, a thin layer comprising at least one oxygen containing compound selected from the group consisting of metal oxides, metal phosphates and metal carbonates, uncoated surface portions projecting above said thin layer to provide for electrical contact to said wire along the length of the wire, the said oxygen containing compound being such that during the arc-welding process it stabilizes the arc, the thickness of the layer being so related to the diameter of said wire and to the contemplated rate of consumption of said electrode that during arc-welding sufficient oxygen is available at the end of the electrode as it is being melted to maintain a stabilized arc without producing substantial oxidation of the work being welded.

References Cited in the file of this patent

UNITED STATES PATENTS

| | | |
|---|---|---|
| 1,374,711 | Armor | Apr. 12, 1921 |
| 1,501,266 | Brace | July 15, 1924 |
| 1,728,863 | Ipsen | Sept. 17, 1924 |
| 1,528,878 | Halslag | Mar. 10, 1925 |
| 1,702,304 | Kotchi | Feb. 19, 1929 |
| 1,936,349 | Castle | Nov. 21, 1933 |
| 1,954,009 | Kotchi | Apr. 10, 1934 |
| 1,978,318 | Miller | Oct. 23, 1934 |
| 2,005,902 | Mathias | June 25, 1935 |
| 2,021,628 | Larson | Nov. 19, 1935 |
| 2,102,813 | Southgate | Dec. 21, 1937 |
| 2,532,410 | Kennedy | Dec. 5, 1950 |
| 2,532,411 | Kennedy | Dec. 5, 1950 |
| 2,694,763 | Muller | Nov. 16, 1954 |
| 2,694,764 | Muller | Nov. 16, 1954 |

OTHER REFERENCES

"Arc Welding in Argon Gas," pages 23 through 27, by Doan and Schulte, Journal of the American Welding Society, vol. 15. Copyright 1936 by the American Welding Society.

"Welding Handbook," 1938, pages 27, 28, 35 and 39. Copyright 1938 by the American Welding Society. Printed by the American Book Bindery, Stranford Press, Inc.

"Welding Handbook," 1942, pages 60, 61, 135, and 188. Copyright 1942, by the American Welding Society. Printed by the American Book Bindery, Stranford Press, Inc.

"Welding and Its Applications," Rossi, pages 134 and 329. Copyright 1941, Maple Presses, York, Pennsylvania.